April 28, 1931.  C. L. HOFF ET AL  1,803,187

EMERGENCY REPAIR LINK

Filed Dec. 14, 1927

INVENTORS
C. L. Hoff,
G. G. Naugle,
BY
ATTORNEYS

Patented Apr. 28, 1931

1,803,187

UNITED STATES PATENT OFFICE

CARLTON L. HOFF AND GIRARDUS G. NAUGLE, OF YORK, PENNSYLVANIA

EMERGENCY REPAIR LINK

Application filed December 14, 1927. Serial No. 240,007.

This invention relates to improvements in chains and particularly to a repair link especially adapted for use as the center link of the cross chains in an anti-skid device for vehicle wheels.

The primary object of the present invention is to provide a cross chain link which will possess a maximum resistance to side slipping of a wheel on which it is carried.

A further object of the invention is to provide a repair link that may be produced at an exceedingly reasonable cost and which may be readily attached to the end links of two sections of a cross chain.

More specifically, the invention consists in the provision of a link whose side edges are disposed spirally with respect to a line extending longitudinally of the link and wherein a portion of each end face of the material of which the link is formed is laterally offset with respect to the side edge of the other end portion of said material. Preferably, the end portions which are each positioned at a point to one side of the other end portion are also located in the same plane although this is not a necessity nor a requisite characteristic to the proper functioning of the link so far as side slip of the tire wheel carrying device is concerned.

In the accompanying drawings,—

Figure 1:
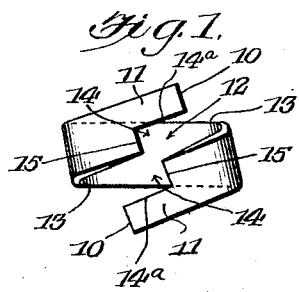
Figure 1 is a plan view of the open side of the link.
Figure 2:
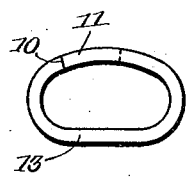
Fig. 2 is a side edge view of said link.
Figure 3:
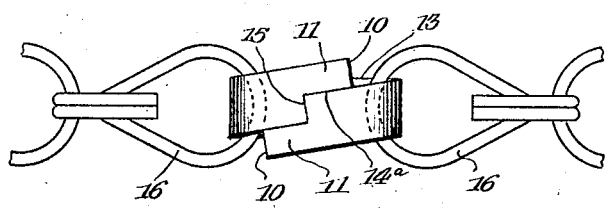
Fig. 3 shows the link connecting two sections of chain, the repair link in this instance being totally closed.

In the preferred embodiment of the invention shown in Figs. 1 to 3 the links are made up from what might be termed a flat strip-like form of stock as distinguished from stock circular in cross section although it will be understood that the latter form of material may be used if desired. In making up the link the material is formed up spirally with respect to a line extending lengthwise of the link or transversely of the tread to which a chain containing the link may be applied.

In anti-skid devices, it is highly desirable that they possess the maximum ability to prevent or overcome side slipping, or skidding in a direction transversely of the tread of a vehicle wheel. In the present instance, this desirable characteristic is provided by having portions of the end faces of the link offset laterally or, in other words, a portion of each end face of the link is located at a point beyond the side edge of the other end portion of the link, both of the end portions, however, preferably being located in the same transverse plane. By thus having the end portions of the link offset more resistance to side skidding is offered than would be the case where the end of the links were lined up with each other so as to form a link having a comparatively straight edge forming the boundaries of its road engaging surface.

In producing the link, the metal stock is bent into the forms shown in the drawings, but in bending it up the strip is arranged spirally with respect to a line extending longitudinally of the link, or transversely of the tread of the wheel on which the cross chain is carried. In this way, the end faces 10 of the end portions 11 are offset each beyond the side edge 13 of the opposite end portion of the link. Said end portions are spaced apart to form an opening 12 through which the end links of two chain sections may be inserted, said opening being so disposed transversely of the link as to ordinarily prevent accidental displacement of the end links 16 from the repair link. However, if desired, the link when placed in the chain may be closed by bringing the two end portions 11 together as shown in Fig. 3. Whether the end portions 11 are left open or whether they are closed, a portion of each end face 10 will remain outside or beyond the side edge of the other end of the link. Not only will these laterally disposed portions of the end faces offer resistance to the side skidding of the vehicle wheel but by having the metal formed up spirally it will be seen that practically the entire side edges of the portion of the link which engage the roadway will offer resistance to the side slipping of the vehicle wheel as said edges, at all points, are disposed at an angle to a line extending transversely of the tread of said wheel.

In the form shown in Figs. 1 to 3, the opening 12 is of what might be called a step formation, a portion of each end of the link being cut away as at 14 so that when the link is closed the portions 15 of the link may abut against one another while the portions 14a of the cut away portion engage a side edge of the opposite ends of the link. In this way the portions 11 of the end surfaces of the link are necessarily caused to be positioned at a point beyond or to one side of the side edges of the link. Also, the abutting portions 15 prevent contraction of the link by an endwise movement of the link ends toward each other. It will be understood, however, that the particular formation, of the link, i. e., the spirally forming up, is not necessary in order to cause a portion of the end surfaces of the link to be offset laterally. So far as the offsetting of the end portion of the links is concerned this may be obtained in ways other than that described in the present instance without departing from the spirit of the invention in its broadest aspect.

What we claim is:

1. A link having an opening in one of its sides for the insertion of other links, portions of the end faces of the material of which said link is formed being offset laterally to prevent side skidding of a wheel on which said link is used, and the remaining portions of said end faces having shoulders formed thereon, said shoulders being opposed to and in contact with each other when said link is closed.

2. A link having an opening in one of its sides, portions of the ends of the material being opposed to and substantially in contact with each other when said link is closed and the remaining portions of said ends projecting laterally beyond the side edges of the ends of said material to prevent side skidding of a wheel on which said link is applied.

3. A link having an opening in one of its sides with a portion of each end face of the material of which said link is formed located to one side of the side edge of the other end portion of said link and the remaining portions of said end faces being adapted to abut against each other when the link is closed, said abutting portions preventing movement of link ends endwise toward each other.

4. A link having its ends lying in the same plane with portions of the two ends abutting each other, for preventing contraction of the link by endwise movement of the link ends toward each other and portions of each end lying laterally of the side edges of the other end.

5. A link formed of a piece of material wound spirally with a portion of one end abutting a portion of the other end and a portion of each end of the material lying beyond the side edge of the other end to prevent side skidding of a wheel on which said link is used.

CARLTON L. HOFF.
GIRARDUS G. NAUGLE.